NET OIL METER
Filed Nov. 13, 1961 2 Sheets-Sheet 1
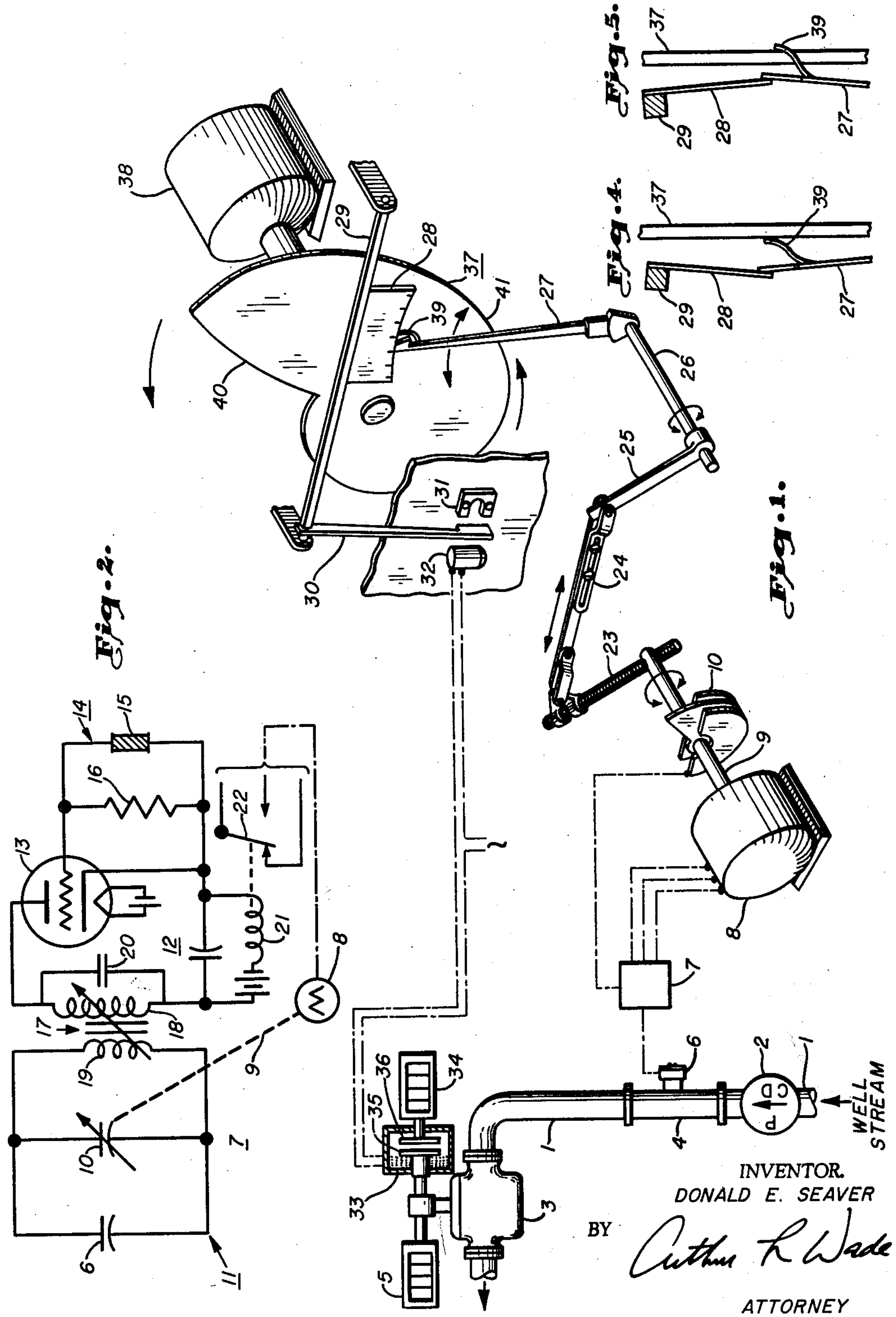
INVENTOR.
DONALD E. SEAVER
BY Arthur R. Wade
ATTORNEY INVENTOR.
DONALD E. SEAVER
BY Arthur L Wade
ATTORNEY 3,142,985
Patented Aug. 4, 1964

3,142,985

NET OIL METER

Donald E. Seaver, Tulsa, Okla., assignor to Instruments, Inc., Tulsa, Okla., a corporation of Oklahoma Filed Nov. 13, 1961, Ser. No. 151,905
4 Claims. (Cl. 73—233)

The present invention relates to measuring the volume of oil well production. More particularly, the invention relates to improvements in a circuit used in manifesting the full range of oil to water ratios in oil well production.

The crystal-controlled vacuum-tube circuit disclosed in United States Patent Gunst et al. 2,720,624, issued October 11, 1955, has been the basis for many instruments sold in the oil industry to manifest the percentage of basic sediment and water in oil well production. Although not disclosed in the patent, commercial versions of the circuit commonly use a coupling transformer between the plate circuit of the oscillator and the input circuit of the capacitance probe. This coupling transformer was adopted in order to isolate resistance changes in the input circuit from the oscillator so the oscillator will primarily respond to capacitance change in the input circuit.

As a practical matter, the inductance of the transformer windings in the input and plate circuits has been of little concern to design engineers developing commercial embodiments of the Gunst et al. circuit. Over ranges of capacitance variation heretofore employed in the input circuit, the variation of plate current has been consistent and useful in both indication and control. The ranges of capacitance employed to detect small amounts of water in oil well production has been employed to give useful variations in plate current.

The plate circuit in the Gunst et al. system approaches resonance as the capacitance of the input, or load, circuit increases. With transformer winding inductance in both the plate circuit and the input circuit, the input circuit and the plate circuit appear to approach resonance at substantially the same time. Eventually, an input capacitance value is reached in the load, or input, circuit which will cause both circuits, through the coupling transformer, to interact and stop the decrease of plate current.

Further increase in capacitance input, or load, will cause a rapid rise of plate current. With this rise, there will be a second range of plate current values which will match a first range of the plate current values. When this discontinuity in the plate current variation occurs, the manifestation or control action initiated by the plate current becomes useless.

A primary object of the present invention is to provide a continuous and consistent variation in the relationship between the plate current of a crystal-controlled vacuum-tube oscillating circuit and an input circuit, transformer-coupled to the plate circuit, over a predetermined range of capacitance input, or load.

Another object is to adjust the resonance of the plate circuit and the resonance of the input circuit to obtain a consistently increasing range of plate current values over a range of increasing capacitance values from the capacitance value of substantially pure oil to substantially pure water.

The present invention contemplates the plate circuit of a crystal-controlled vacuum-tube oscillating circuit, tuned with a predetermined low capacitance load on an included coupling transformer, to pass minimum current, the tuning being at the frequency of the crystal; and an input circuit also including the coupling transformer tuned to permit the plate circuit to pass maximum current at a predetermined high capacitance load on the input circuit. The variation of capacitance load in the input circuit, over the predetermined range will cause the plate circuit current to change consistently in one direction.

Other objects, advantages and features of this invention will become apparent to one skilled in the art upon consideration of the written specification, appended claims and attached drawings, wherein FIG. 1 is a schematic illustration, partly in isometric, illustrating various components of a complete system in which the invention is embodied;

FIG. 2 is a schematic illustration of the electric circuit directly responsive to the dielectric of the oil well production as a part of the system of FIG. 1 and which embodies essential components of the invention;

FIG 4 is a side view of the cam of FIG. 1 and a mechanical element of the FIG. 1 system in a first of two positions; and FIG. 5 is the cam and element of FIG. 3 in the second of two positions.

*General System*

Figure 3:
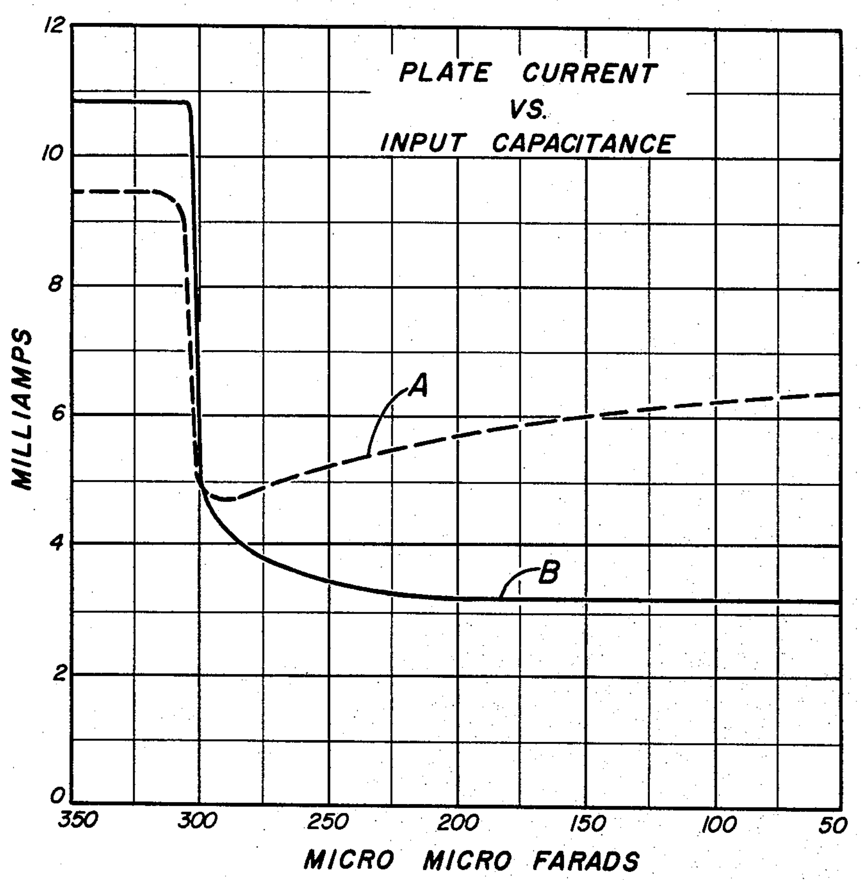
FIG. 3 is a graph of plate current vs. capacitance input to the circuit of FIG. 2.

FIG. 1 illustrates the general system in which the present invention is embodied. A pipe line 1 is illustrated as carrying the production of an oil well. The production is moved through conduit 1 at a constant rate by pump 2. A measure of the total volume of production liquids is made by positive displacement meter 3, and a measurement is made of one of the liquids of the production at probe 4.

To make the disclosure in simple terms, the production liquids through conduit 1 well be considered as a mixture of water and oil. The ratio of oil to water will be presumed to vary from substantially all oil and no water to substantially all water and no oil. A measurement signal is initiated at probe 4, as a primary element, which signal will be considered as proportional to the amount of water in the production mixture. With pump 1 holding the rate through probe 4 and meter 3 constant, the probe signal becomes representative of the water and oil ratio.

*Total Fluid Measurement*

The production in conduit 1 is presumed to be drawn from a specific property into a gathering system for processing. The total volume of the production liquids is measured by a positive displacement meter 3. The drawing illustration indicates the primary element of meter 3 as mechanically connected to continuously operate a register 5. Register 5 gives a continuous manifestation of the total amount of fluids passed through conduit 1.

The present invention enables a second register to be coupled to the primary element of meter 3 a portion of the total time the first register is actuated, that portion being representative of the proportion of water in the production passing through conduit 1. The system for developing this coupling function includes the present invention and produces a series of pulses over the time span of total fluid measurement at a constant rate, controlled by the probe 4 as a primary element.

Although the probe is generally designated at 4, more specifically a capacitance element 6 is mounted in the probe for direct insertion into and contact with the fluids of conduit 1. The drawing indicates capacitance element 6 as electrically incorporated into a circuit within an instrument 7. The electric circuit within instrument 7 controls the rotation of a motor 8. As motor 8 is positioned by the electric circuit of instrument 7, it turns shaft 9 on which is mounted a variable capacitance unit 10. The electric circuit is completed by indicating capacitance unit 10 as electrically included in the circuit of instrument 7.

*Circuit of Instrument 7*

Referring specifically to FIG. 2, the essential features of the electric circuit embodying the present invention are indicated. Electrical symbols have been utilized to represent capacitance element 6, motor 8 and variable capacitance 10. In general, capacitance element 6 and capacitance element 10 are included in an input circuit to a crystal-controlled vacuum-tube oscillator.

Motor 8 is controlled in its direction of rotation by the variation of plate current in the oscillator. If the plate current increases, motor 8 rotates in one direction. If the plate current decreases motor 8 operates in the other direction. The rotation of motor 8 adds or subtracts capacitance to the input circuit to return the plate current to a predetermined value. The position of motor 8 and capacitance element 10 at a particular value of plate current may be referred to as their null position.

A crystal-controlled vacuum-tube oscillator of the type disclosed in FIG. 2 is the subject matter of at least United States patent Gunst et al. 2,720,624, issued October 11, 1955. In that patent disclosure, the input capacitance is described as connected in the plate circuit of the oscillator. A grid resistor is made high enough in value that the oscillations of the circuit are sustained at substantially zero capacity values of input. However, in my circuit which I disclose in FIG. 2, a plate circuit has its current maintained at a predetermined value to which it is always returned as a null.

The input circuit of my oscillator is generally referred to at 11. The oscillator circuit may be broken up into two sections for the present consideration. The plate circuit 12 is a loop including the plate of tube 13. The crystal loop 14 includes crystal 15, the grid of tube 13 and grid resistor 16.

When plate circuit 12 has the inductance and capacitance values which cause it to resonate at the crystal frequency, the plate circuit current will be at its minimum value. If circuit 11 increases in capacitance, the current in plate circuit 12 will increase. The input and plate circuits are coupled together through a transformer to give this concomitant capacitance increase and plate current increase.

Coupling transformer 17 has a primary winding 18 and a secondary winding 19 with an adjustable core indicated between them. Previous designers of these circuits have simply utilized a coupling transformer with a one to one ratio. Plate current values at null have been selected carelessly without due regard to the entire pattern of plate current values over a wide range of input from circuit 11. My close study of plate circuit variation over a wide range of capacitance input from circuit 11 has enabled me to discover a discontinuity in the variation of plate current which can easily cause ambiguous manifestations.

Referring specifically to FIG. 3, I have illustrated the variation of plate current of circuit 12 when a one to one coupling transformer is utilized betwen input circuit 11 and plate circuit 12. Curve A illustrates how the plate current will decrease as input capacitance increases. With the particular circuit configuration used in an actual test, the plate current decreased from about 6.5 milliamps. to about 4.6 milliamps. over the input capacitance range of 50 micromicrofarads to 285 micromicrofarads. Thereafter, on an increase of capacitance input, the plate current increased rapidly, giving plate current values over a small range of input capacitance which equal the plate current values over the wide range of capacitance input.

Referring to curve A again, if a null value of plate current were selected as 5.6 milliamps., there would be an input capacitance of 300 micromicrofarads which would produce this design value of plate current. Thereafter, as the capacitance at 6 varied the plate current variation would produce rotation of motor 8 which would adjust capacitance element 10 to return the total input capacitance of circuit 11 to 300 micromicrofarads. Operation would be consistent over the range of capacitance element 10 in adding or subtracting enough capacitance to return the total capacitance of input circuit 11 to 300 micromicrofarads.

However, with a one to one coupling transformer exhibiting the characteristic of curve A it is conceivable that a large decrease in input capacitance at 6 could reduce the total input capacitance to 200 micromicrofarads. As discovered by a study of cure A, motor 8 would remain in its null position although capacitance 6 had indicated a large change in the dielectric to which it is responsive. In effect, the use of the one to one coupling transformer of the prior art will give the same null position for motor 8 although the variable sensed has greatly changed in value. When it is considered that capacitance element 6 is to respond to the full range of ratios of oil and water in conduit 1, the possibility of the same null position of motor 8 at two different values of input from circuit 11 provides an ambiguous manifestation which is a serious defect. The present invention eliminates this problem.

Under the teachings of the present invention, the primary winding 18 of coupling transformer 17 is increased in turns over those turns of the secondary winding 19. These additional windings give an inductance increase in plate circuit 12 which is combined with a capacitance increase as illustrated by the addition of capacitor 20 across primary windings 18. These values of inductance and capacitance given are adjusted to produce resonance of plate circuit 12 at the frequency of crystal 15. Further, these values are selected while a predetermined low capacitance load is applied to secondary windings 19 in order to establish the minimum plate current for circuit 12.

The total capacitance of input circuit 11 is then increased to produce the plate current value which will represent substantially all water and no oil in the production through conduit 1. The result of these adjustments of circuit values is shown by curve B in FIG. 3. As the capacitance input from circuit 11 increases from substantially that of oil to that of pure water, the plate current of circuit 12 increases consistently without the discontinuity and ambiguousness of curve A.

The structure I now provide for coupling transformer 17, in combination with input circuit 11, and plate circuit 12, produces a reliable manifestation of water in the well liquids passing through probe 4, for the system of FIG. 1. Coil 21 of a solenoid is connected in the plate circuit 12. Depending upon the direction of change in the plate current of circuit 12, solenoid 21 actuates switch 22 from one to the other of alternate positions. Two-position switch 22 controls the direction of rotation of motor 8. Motor 8, in turn, mechanically rotates shaft 9 to position capacitance element 10 to bring the circuit to its null balance. The ultimate function of the FIG. 2 circuit, therefore, is to rotate shaft 9 to various positions within a range of capacitance values representative of varying amounts of water in the fluids passing through conduit 1.

*Linkage Between Shaft 9 and the Cam*

FIG. 1 is partially drawn in isometric to give clarity as to how shaft 9 positions the linkage 23, 24 and 25, and how shaft 26 is rotated through its range of positions. Adjustment of the mechanical linkage is illustrated by showing link 24 having an adjustable length. Further, link 23 is illustrated as threaded to a fixture on the end of link 24 to be placed at varying distances from the axis of shaft 9. Specific adjustments disclosed merely represent the many arrangements which can be provided to develop the relative ranges of motion required between shaft 9 and shaft 26.

On shaft 26 there is mounted a cam-contacting arm 27. Arm 27 is mounted from one of its ends to extend at right angles to the axis of shaft 26. When shaft 26 rotates, arm 27 moves through an angular range of movement which is indicated by scale 28.

Particular note is to be made of the fact that arm 27 is moved through its angular range by rotation of shaft 26 while being flexed from its free end. The free end is given alternate positions on a line parallel to the axis of shaft 26. A cam is provided to contact the free end of arm 27 and flex arm 27 in positioning the free end from one to the other of the two alternate positions. This cam-arm 27 cooperation will be developed infra.

*Switch Actuation*

Scale 28 is provided to both indicate the angular positions of flexing, cam-contacting arms 27, and to function as part of the linkage system with which the cam-generated motion of the arm end is transmitted. In order to transmit motion of the cam-positioned free end of arm 27, scale 28 is mounted rigidly upon rotating bar 29. Arm 30, is fixed to, and depended from, one end of bar 29. Arm 30 is carried from one to another of two positions as bar 29, scale 28 and the end of arm 27 are carried from one to the other of their two positions by the cam.

The depending, or free, end of arm 30 is utilized to divert the flux of a magnet 31. Magnet 31 normally directs its flex to hold switch 32 in an open position. However, when the depending, free end of arm 30 is brought between magnet 31 and switch 32, the flux of magnet 31 is diverted through the arm 30 and switch 32 will have its contacts closed.

*Energized Electric Circuit*

An electric circuit is arranged to include both switch 32 and a suitable electrical power source. A coil of the solenoid clutch 33 is also included in this circuit. Clutch 33 is mechanically positioned between the actuating shaft of positive displacement meter 3 and register 34 and spring urged to disengage meter 3 and register 34. When the electric circuit is completed through switch 32, clutch 33 is energized, the clutch spring is overcome and plates 35 and 36 are held together in order for register 34 to be actuated by positive displacement meter 3. When the total time which meter 3 is actuated by the total fluids passing through meter 3 at a constant rate is broken into increments, and the electric circuit is completed the portion of those increments proportional to the water-oil ratio of the total liquids, register 34 will cumulate the portions in terms of net oil in the production meter.

*Cam Generated Pulses*

Returning to a consideration of the mechanical linkage, arm 27 is seen as arranged for simultaneous rotation by shaft 26 and flexure by cam 37. Motor 38 rotates cam 37 at a constant speed. The plane of cam 37 is positioned relative to rider 39 on the end of arm 27 so that the leading edge 40 of the cam will engage the rider 39 and move it up on the surface of cam 37. As cam 37 rotates, rider 39 will be supported on the cam surface the distance from edge 40 to trailing edge 41. In this general manner, as cam 37 rotates, the linkage system of scale 28, bar 29 and arm 30 is carried from one to the other of two positions by the rotation of cam 37.

In engineering the system in which the invention is embodied, the range of movement given rider 39 on flexing arm 27 is coordinated with the shape of cam 37 between its leading and trailing edges to provide for flux-controlling arm 30 to complete the circuit with switch 32 and generate electrical pulses with its circuit for a series of intervals whose lengths are proportional to the water in the fluids of conduit 1. Obviously, the cam 37 is consistently shaped to provide a longer path along its surface for rider 39 as arm 27 is rotated toward the center of rotation of cam 37. When the cam 37, between its leading edge 40 and trailing edge 41, is properly shaped, register 34 will produce the manifestation of the amount of water in any total quantity of fluids passing through meter 3 at a constant rate.

FIG. 4 and FIG. 5 illustrate the two positions to which the free end of arm 27 is carried. FIG. 4 specifically shows rider 39 as having contacted leading cam edge 40. Rider 39 has been lifted up upon the surface of cam 37 and bar 29 has been rotated by scale 28. FIG. 5, of course, illustrates the relative position of bar 29, scale 28, rider 39 and cam 37 after cam 37 has rotated far enough that rider 39 has dropped off the trailing edge 41.

The disclosed arrangement provides energization of the electric circuit by switch 32 in pulses whose lengths are proportional to the amount of water in the fluids flowing through conduit 1 at a constant rate. The result is an actuation of register 34, or of manifesting devices, to total up the pulses as an integration of the amount of water in the production fluids.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to interpreted as illustrative and not in a limiting sense.

The present invention having been described, what is claimed is:

1. A meter system with which the net oil of well production having high water-oil ratio is manifested, including a conduit through which the production is passed;

a constant displacement pump in the conduit and moving the production through the conduit at a constant rate;

a positive displacement meter in the conduit recording the total volume of liquids of the production;

a capacitance unit mounted in the conduit to respond to the dielectric constant of the liquids of the production as a primary element;

an electro-mechanical system responsive to the primary element, and including, (*a*) a crystal-controlled vacuum-tube oscillator circuit having a plate circuit tuned at a predetermined small load resonance of the crystal, (*b*) an input circuit including the primary element capacitance unit, (*c*) a coupling transformer linking the plate circuit and input circuit together, (*d*) a mechanically adjustable capacitance unit included in the input circuit which is adjusted to return the plate current to a predetermined value, (*e*) and a motor responsive to the plate current and mechanically linked to the adjustable capacitor to return the plate current to the predetermined value;

a linkage-cam-electric circuit system for transducing the motor positions into electric pulses whose cumulative length have a ratio to the total time the positive displacement meter is actuated which is equal to the ratio of the water to oil in the liquids to which the capacitance unit primary element responds;

and a water register coupled to the positive displacement meter by the transducing circuit electric pulses so as to cumulate the total water passed through the meter, whereby the water register reading may be subtracted from the total volume register of the positive displacement meter to ascertain the net oil passed through the conduit during a predetermined period.

2. A meter system with which the net oil of well production having high water-oil ratio is manifested, including a conduit through which the production is passed;

a constant displacement pump in the conduit and moving the production through the conduit at a constant rate;

a positive displacement meter in the conduit recording the total volume of liquids of the production;

a capacitance unit mounted in the conduit to respond to the dielectric constant of the liquids of the production as a primary element;

an electro-mechanical system responsive to the primary element, and including, (*a*) a crystal-controlled vacuum-tube oscillator circuit having a plate circuit tuned at a predetermined minimum load resonance of the crystal, (*b*) an input circuit including the primary element capacitance unit, (*c*) a coupling transformer linking the plate circuit and input circuit together and tuned to permit maximum current to pass in the plate circuit at a predetermined high value of dielectric constant of the liquids through the primary element, (*d*) a mechanically adjustable capacitance unit included in the input circuit which is adjusted to return the plate current to a predetermined value, (*e*) and a motor responsive to the plate current and mechanically linked to the adjustable capacitor to return the plate current to the predetermined value;

a linkage-cam-electric circuit system for transducing the motor positions into electric pulses whose cumulative length have a ratio to the total time the positive displacement meter is actuated which is equal to the ratio of the water to oil in the liquids to which the capacitance unit primary element responds;

and a water register coupled to the positive displacement meter by the transducing circuit electric pulses so as to cumulate the total water passed through the meter, whereby the water register reading may be subtracted from the total volume register of the positive displacement meter to ascertain the net oil passed through the conduit during a predetermined period.

3. A meter system with which the net oil of well production having high water-oil ratio is manifested, including a conduit through which the production is passed;

a constant displacement pump in the conduit and moving the production through the conduit at a constant rate;

a positive displacement meter in the conduit recording the total volume of liquids of the production;

a capacitance unit mounted in the conduit to respond to the dielectric constant of the liquids of the production as a primary element;

an electro-mechanical system responsive to the primary element, and including, (*a*) a crystal-controlled vacuum-tube oscillator circuit having a plate circuit, (*b*) an input circuit including the primary element capacitance unit, (*c*) a coupling transformer linking the plate circuit and input circuit together which units of fixed capacitance in both circuits function in combination with the inductance of the transformer to limit the plate circuit current to a minimum when the dielectric constant of the liquids of the production is at a predetermined low value and produce maximum current when the dielectric constant of the liquids of the production is at substantially the value of water of the production, (*d*) a mechanically adjustable capacitance unit included in the input circuit which is adjusted to return the plate current to a predetermined value, (*e*) and a motor responsive to the plate current and mechanically linked to the adjustable capacitor to return the plate current to the predetermined value;

a linkage-cam-electric circuit system for transducing the motor positions into electric pulses whose cumulative length have a ratio to the total time the positive displacement meter is actuated which is equal to the ratio of the water to oil in the liquids to which the capacitance unit primary element responds;

and a water register coupled to the positive displacement meter by the transducing circuit electric pulses so as to cumulate the total water passed through the meter, whereby the water register reading may be subtracted from the total volume register of the positive displacement meter to ascertain the net oil passed through the conduit during a predetermined period.

4. A meter system with which the net oil of well production having high water-oil ratio is manifested, including a conduit through which the production is passed;

a constant displacement pump in the conduit and moving the production through the conduit at a constant rate;

a positive displacement meter in the conduit recording the total volume of liquids of the production;

a capacitance unit mounted in the conduit to respond to the dielectric constant of the liquids of the production as a primary element;

an electro-mechanical system responsive to the primary element, and including, (*a*) a crystal-controlled vacuum-tube oscillator circuit having a plate circuit, (*b*) an input circuit including the primary element capacitance unit, (*c*) a coupling transformer linking the plate circuit and input circuit together, the primary winding in the plate circuit having more turns than the secondary winding in the input circuit, (*d*) a fixed capacitor connected across the primary winding in the plate circuit, the value of the capacitor and the inductance of the transformer windings being such as to produce resonance of the plate circuit at the frequency of the crystal while a predetermined low capacitance load is applied to the secondary winding, (*e*) a mechanically adjustable capacitance unit included in the input circuit which is adjusted to return the plate current to a predetermined value, (*f*) and a motor responsive to the plate current and mechanically linked to the adjustable capacitor to return the plate current to the predetermined value;

a linkage-cam-electric circuit system for transducing the motor positions into electric pulses whose cumulative length have a ratio to the total time the positive displacement meter is actuated which is equal to the ratio of the water to oil in the liquids to which the capacitance unit primary element responds;

and a water register coupled to the positive displacement meter by the transducing circuit electric pulses so as to cumulate the total water passed through the meter, whereby the water register reading may be subtracted from the total volume register of the positive displacement meter to ascertain the net oil passed through the conduit during a predetermined period.

References Cited in the file of this patent

UNITED STATES PATENTS

| | | |
|---|---|---|
| 1,893,214 | Young | Jan. 3, 1933 |
| 2,135,017 | Sharland | Nov. 1, 1938 |
| 2,329,370 | Hicks et al. | Sept. 14, 1943 |
| 2,617,299 | Ennis et al. | Nov. 11, 1952 |
| 2,742,609 | Black et al. | Apr. 17, 1956 |